United States Patent [19]

Heckman

[11] 4,392,995
[45] Jul. 12, 1983

[54] MOLTEN TIN REPROCESSING OF SPENT NUCLEAR FUEL ELEMENTS

[75] Inventor: Richard A. Heckman, Castro Valley, Calif.

[73] Assignee: The United States of America as represented by the United States Department of Energy, Washington, D.C.

[21] Appl. No.: 218,242

[22] Filed: Dec. 19, 1980

[51] Int. Cl.³ .................................................. G21C 19/48
[52] U.S. Cl. ........................................ 252/627; 423/4; 423/5; 423/11
[58] Field of Search .................... 423/4, 5, 11; 252/627

[56] References Cited

U.S. PATENT DOCUMENTS 3,843,765  10/1974  Anderson et al. .................... 423/11
3,843,766  10/1974  Anderson et al. .................... 423/11
4,234,383  11/1980  Anderson et al. ..................... 423/5

Primary Examiner—Herbert T. Carter

[57] ABSTRACT

A method and apparatus for reprocessing spent nuclear fuel is described. Within a containment vessel, a solid plug of tin and nitride precipitates supports a circulating bath of liquid tin therein. Spent nuclear fuel is immersed in the liquid tin under an atmosphere of nitrogen, resulting in the formation of nitride precipitates. The layer of liquid tin and nitride precipitates which interfaces the plug is solidified and integrated with the plug. Part of the plug is melted, removing nitride precipitates from the containment vessel, while a portion of the plug remains solidified to support the liquid tin and nitride precipitates remaining in the containment vessel. The process is practiced numerous times until substantially all of the precipitated nitrides are removed from the containment vessel.

7 Claims, 1 Drawing Figure

MOLTEN TIN REPROCESSING OF SPENT NUCLEAR FUEL ELEMENTS

BACKGROUND OF THE INVENTION

The present invention relates in general to reprocessing of fuels, and more particularly to a system for reprocessing spent nuclear fuel elements. The United States Government has rights in this invention pursuant to Contract No. W-7405-ENG-48 between the U.S. Department of Energy and the University of California.

Methods for reprocessing spent nuclear fuel are known. A system known as the Molten Tin process has been described by Robert N. Anderson and Norman A. Parlee in U.S. Pat. No. 3,843,765. Molten tin is used as a solvent and reaction medium in the process to separate actinide fuels from fission products and other materials by precipitating out the actinides which are insoluble in molten tin. The spent nuclear fuel is declad, and put into solution in molten tin contained in a graphite crucible at ~1900° K. with a nitrogen atmosphere. The graphite is a refractory material which is inert to the treated solution. Appropriate control of the nitrogen pressure and the temperature of the liquid tin permits the selective separation (as nitrides) of unburned fuel from fission products and higher actinides. The actinide nitrides that precipitate out of the molten tin sink to the bottom of the crucible, and other nitrides float on the surface of the molten tin. The system provides for the removal of the solid particles from the molten tin bath, but not from the containment vessel.

Another system for removing the solid particles has been suggested wherein the liquid tin, with the solid particles, are drained from the vessel, and the liquid tin is vaporized in a vacuum, leaving the solid particles (see U.S. Pat. No. 3,843,766; Col. 3, lines 4-9). This latter system does not allow continuous processing, and requires an entire reboiling system. In this patent, which also discloses a method of reprocessing nuclear fuels, spent nuclear fuel is dissolved in tin at 500° C. to 1,500° C. The solution is heated in a nitrogen atmosphere to form a uranium precipitate. The liquid tin and precipitates are withdrawn from the processing vessel, and the liquid tin is vaporized in a vacuum, leaving the precipitates.

The methods and apparatus hereinbefore described provide for the reaction of spent fuel with nitrogen to form precipitated nitrides. However, these methods fail to provide for continuous reprocessing of the spent fuel, and are inherently expensive.

SUMMARY OF THE INVENTION

It is an object of the present invention to provide a system for continuous reprocessing of spent nuclear fuel.

It is a further object of the invention to provide a method for continuously reprocessing spent nuclear fuel by precipitating the spent nuclear fuel elements as nitrides, incorporating the nitrides with a supporting plug of solid tin, and alternatively heating and cooling portions of the plug to thereby remove the nitride precipitates.

It is a further object of the present invention to provide a method for continuous reprocessing of spent nuclear fuel, wherein the spent nuclear fuel is immersed in a solvent of molten tin in a nitrogen atmosphere to form nitride precipitates, and wherein both floating nitride precipitates and nitride precipitates that have settled to the bottom of the containment vessel are removed.

It is yet another object of the invention to provide an apparatus for practicing a method for the continuous reprocessing of spent nuclear fuel.

Additional objects, advantages, and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects, and in accordance with the purpose of the present invention as embodied and broadly described herein, a method and apparatus is provided for reprocessing spent nuclear fuel. An apparatus having liquid tin disposed within a containment vessel, and a solid plug of tin, disposed within the containment vessel to interface and support the liquid tin and nitride precipitates within the vessel, is employed. The spent nuclear fuel is immersed in the liquid tin under an atmosphere of nitrogen, resulting in the formation of nitride precipitates from the spent nuclear fuel. The nitride precipitates are dispersed throughout the liquid tin. That layer of liquid tin and nitride precipitates which interfaces with the plug is solidified and integrated with the plug, a portion of the plug is melted, while a sufficient amount remains solidified to provide support for the liquid tin and nitride precipitates remaining in the containment vessel.

Formation of nitride precipitates from the spent nuclear fuel and the removal of the precipitates from the containment vessel can proceed continuously. There is no need to halt operation of the system to remove the precipitated nitrides, and spent nuclear fuel can be fed into the system without interruption. Ultimately, all the floating nitride precipitates within the liquid tin will eventually settle to the bottom of the containment vessel and can then be removed. Additionally, by controlling the temperature of the reaction vessel and the partial pressure of the nitrogen introduced therein, the selective precipitation of spent nuclear fuel elements, and hence their removal, may proceed in a continuous manner.

BRIEF DESCRIPTION OF THE DRAWINGS

The accompanying drawing, which is incorporated in and forms a part of the specification, illustrates an embodiment of an apparatus for practicing the present invention and, together with the description, serves to explain the principles of the invention. In the drawing:

The single FIGURE is an illustrative view of a system that embodies the present invention.

DETAILED DESCRIPTION OF THE INVENTION

Figure 1:
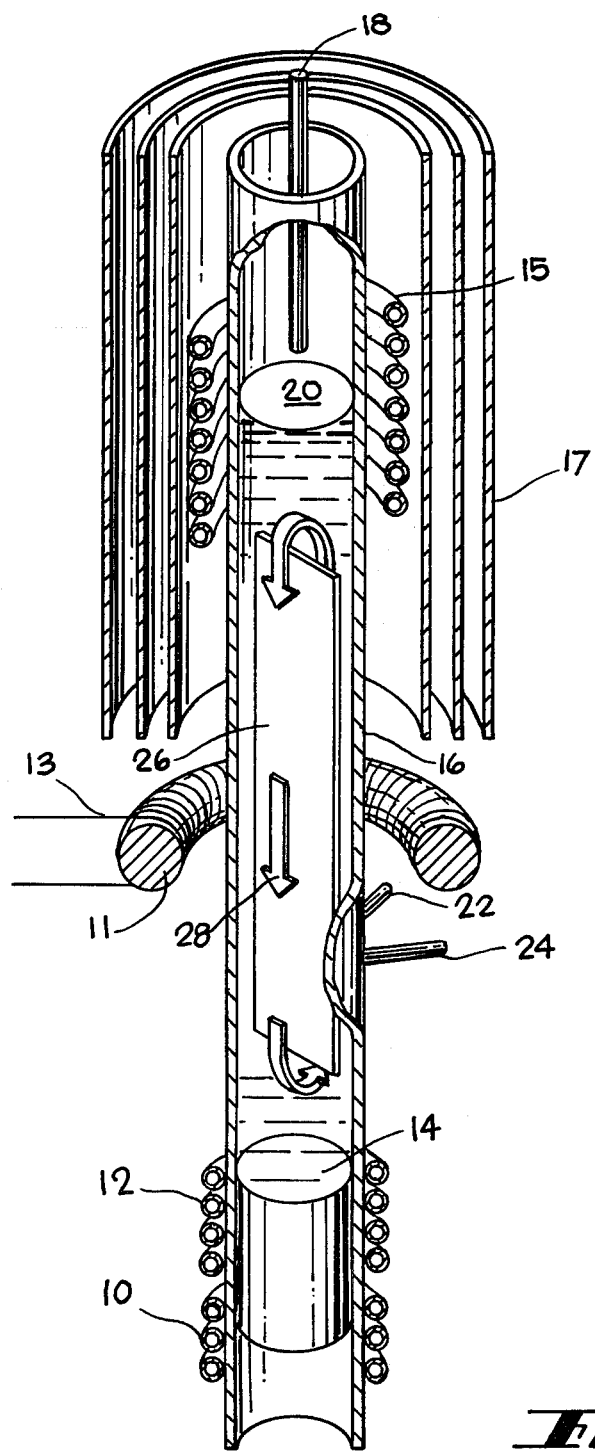

Unburned fissionable fuel, fission products, and higher actinides can be separated from spent reactor fuel elements in a liquid tin bath with a nitrogen atmosphere. The unburned fission fuel can be separated from the fission products and higher actinides by adjusting the nitrogen pressure and liquid tin temperature so that the respective nitride precipitates sequentially come out of solution. Each of the nitride precipitates must then be separated from the liquid tin. This may be accomplished by alternately solidifying and remelting the liquid tin at the bottom of the graphite containment vessel. An advantage of the present invention is that it is relatively inexpensive, simple, and capable of continuously processing conventional reactor fuel elements.

Referring now to the drawing, an apparatus for separating unburned fission fuel from the fission products and higher actinides is illustrated. A feed mechanism (not shown) introduces spent nuclear fuel element 18 and nitrogen into containment vessel 16. Rods or other forms of spent nuclear fuel are first introduced to the feed mechanism. The feed mechanism is then closed off from atmosphere and evacuated. Nitrogen is then introduced and the spent nuclear fuel and nitrogen are then fed into containment vessel 16. The spent nuclear fuel element 18 is then dissolved in a circulating bath of liquid tin 20, which is maintained under the nitrogen atmosphere in containment vessel 16. Vessel 16 is preferably comprised of graphite, a refractory material which is inert to the solution. At the top end of vessel 16 are means 15 for maintaining liquid tin 20 in the liquid state. Such means include radio frequency heating coil 15 connected to a radio frequency generator (not shown) for maintaining a temperature range of from about 1500°–1600° C.

Supported at the top end of vessel 16, and surrounding it, is a series of cylindrical concentric graphite baffles 17 which minimize thermal radiation loss from the vessel. Circulation of liquid tin 20 (an electrical conductor) is effected and maintained by electromagnetic pumping induced by a pair of DC electrodes 22 and 24, positive and negative, respectively, affixed to the exterior of vessel 16. The electrodes are charged by a suitable power supply (not shown). An external magnetic field, perpendicular to the longitudinal axis of vessel 16, is generated by a toroidal electromagnet having a coil 11 surrounding vessel 16 in the vicinity of the electrodes, and solenoid 13 wound about the coil 11. The DC current through the electrodes is of a low voltage with high current, up to several thousand amps. Ohmic heating resulting from the current assists in maintaining the liquid tin at sufficient temperature to achieve dissolution of the spent fuel rods and the formation of nitride precipitates. A graphite splitter plate 26 separates the vessel's interior into two sections, thus permitting pumped circulation of the liquid tin up through one section and down the other, as indicated by the arrow 28. If the graphite splitter plate 26 were not included, one would obtain only a local circulation loop in the vicinity of the DC electrodes.

As illustrated in the drawing, a plug 14, initially comprising solid tin, and eventually having nitride precipitates dispersed therein, is disposed within containment vessel 16. The particular precipitates may be the nitride precipitates of unburned fissionable fuel, fission products, or higher actinides, as explained above. Plug 14 interfaces with and provides support for liquid tin 20 within containment vessel 16. Plug 14 can be thought of as having a top segment which interfaces with liquid tin 20, and a bottom segment on the opposite end of the plug. For alternate heating and cooling of the plug, a pair of continuous heating/cooling coils 10 and 12 with appropriate taps (not shown) for the selective admission of either heating or cooling fluids are provided. The coils are disposed at the exterior of vessel 16, being wrapped thereabout with coil 12, substantially adjacent to the top segment of plug 14, and coil 10 being disposed substantially adjacent to the bottom segment of plug 14.

The coils 10 and 12 are typically in the form of conduits for carrying heating and cooling fluids, and are selectively connectable to a source of heating or cooling fluid by any suitable switching means (not shown). Such a heating or cooling fluid may be, for example, the biphenyl-oxide, Dowtherm.

Removal of the precipitated nitrides from liquid tin 20 is accomplished by solidifying the precipitated nitrides as part of plug 14, and subsequently melting the lower part of the plug, while still maintaining a solid support for liquid tin 20. In greater detail, the precipitated nitrides are dispersed throughout liquid tin 20, with a substantial amount settling on the top of plug 14. In a first cycle, the bottom section of plug 14 is melted by circulating a heated fluid (about 300° C.) through coil 10. Almost simultaneously, coil 12 is cooled. As a result of the heating and cooling, only a thin layer of plug 14 remains solidified, and the plug begins to descend downward. The melted portion of plug 14 (containing the precipitated nitrides formed from the spent nuclear fuel) is caused to flow out of containment vessel 16, and is removed therefrom. A second cycle then begin with the heating and cooling steps reversed when the descending thin layer of plug is adjacent to and surrounded by the lower coils 10, resulting in a new growth of plug 14. In the second cycle, coil 12 is heated and coil 10 is cooled, causing the layer of liquid tin, with the precipitated nitrides that are interfaced with plug 14, to become solidified and part of the plug. The two cycles are practiced numerous times, until substantially all of the precipitated nitrides are removed from vessel 16.

As the removal of precipitated nitrides proceeds, spent nuclear fuel may be continuously fed into vessel 16. In this way, the reprocessing of the spent nuclear fuel can continue uninterrupted without the need for halting operations to removed the precipitated nitrides.

The foregoing description of a preferred embodiment of the invention has been presented for purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for reprocessing spent nuclear fuel in an apparatus having liquid tin dispersed within a containment vessel, and a solid plug of tin and nitride precipitates disposed within said containment vessel to interface with and support said liquid tin therein, comprising:

feeding spent nuclear fuel into said containment vessel;

immersing said spent nuclear fuel in said liquid tin under an atmosphere of nitrogen, resulting in the formation of nitride precipitates from said nuclear fuel, whereby said nitride precipitates are dispersed throughout said liquid tin;

solidifying a layer of liquid tin and nitride precipitates which interfaces with said plug, to thereby integrate said layer with said plug;

melting an end portion of said plug remote from an end of said plug which interfaces with molten tin, whereby said melted end portion may be removed, while leaving a sufficient amount of said plug solidified to provide support for said liquid tin and nitride precipitates remaining in said containment vessel; and removing said melted portion of said plug from said containment vessel.

2. The method for reprocessing spent nuclear fuel as defined in claim 1, further comprising circulating said liquid tin within said containment vessel, to promote nitrogen mixing and formation of nitride precipitates.

3. The method for reprocessing spent nuclear fuel according to claim 1, wherein said liquid tin dispersed within said containment vessel is maintained at a temperature range of from about 1500° to 1600° C.

4. The method for reprocessing spent nuclear fuel according to claim 1, wherein said end portion of said plug remote from said end of said plug which interfaces with molten tin is melted by circulating a heated fluid at about 300° C. around said end portion.

5. A method for reprocessing spent nuclear fuels in an apparatus having liquid tin disposed within a containment vessel, and a solid plug comprising tin and nitrides precipitates, said plug having a top section and a bottom section, with the top section interfacing with and supporting said liquid tin within the containment vessel; comprising the steps of:

(a) fedding spent nuclear fuel into said containment vessel;

(b) immersing said spent nuclear fuel in said liquid tin under an atmosphere of nitrogen, thereby forming nitride precipitates from said spent nuclear fuel, said nitride precipitates being dispersed throughout said liquid tin;

(c) heating the area of said containment vessel adjacent to and surrounding said bottom section of said plug creating a melted portion, said melted portion of said plug being removable from said containment vessel by gravity or other means, while said top section of said plug remains solidified and provides support for said liquid tin and nitride precipitates remaining in said containment vessel, while slowly descending in said containment vessel;

(d) then subsequently cooling the area of said containment vessel adjacent to and surrounding the descending section of said plug to halt its descent, while heating the area of said containment vessel adjacent to said top section of said plug, thereby solidifying the layer of liquid tin and dispersed nitride precipitates which interfaces said top section of said plug, whereby the steps (c) and (d) may be sequentially repeated to thereby effect continuous removal of nitride precipitates from said vessel; and removing said melted bottom section of said plug from said containment vessel.

6. The method for reprocessing spent nuclear fuel as defined in claim 5, further comprising circulating said liquid tin within said containment vessel to promote nitrogen mixing and formation of nitride precipitates.

7. The method for reprocessing spent nuclear fuel according to claim 5, wherein said liquid tin disposed within said containment vessel is maintained at a temperature range of from about 1500° to 1600° C.

* * * * *